(12) United States Patent
Newell et al.

(10) Patent No.: US 6,562,235 B1
(45) Date of Patent: May 13, 2003

(54) ENHANCED ANAEROBIC TREATMENT ZONES IN GROUNDWATER

(75) Inventors: Charles J. Newell, Houston, TX (US); Carol Elaine Aziz, Houston, TX (US); Grant A. Cox, Houston, TX (US)

(73) Assignee: Groundwater Services, Inc., Houston, TX (US)

( * ) Notice: Subject to any disclaimer, the term of this patent is extended or adjusted under 35 U.S.C. 154(b) by 0 days.

(21) Appl. No.: 09/634,019

(22) Filed: Aug. 8, 2000

(51) Int. Cl.[7] .............................. C02F 3/28; E02B 7/02
(52) U.S. Cl. ...................... 210/601; 210/610; 210/747; 435/262.5; 405/107
(58) Field of Search ................................ 210/601, 610, 210/747, 170; 435/262, 262.5; 405/107, 115, 116

(56) References Cited

U.S. PATENT DOCUMENTS

| | | | |
|---|---|---|---|
| 4,288,174 A | 9/1981 | Laws | 405/43 |
| 4,352,591 A * | 10/1982 | Thompson | 210/170 |
| 4,624,604 A | 11/1986 | Wagner et al. | 405/128 |
| 4,778,628 A | 10/1988 | Saha et al. | 252/633 |
| 4,842,448 A | 6/1989 | Koerner et al. | 405/258 |
| 4,990,031 A * | 2/1991 | Blowes et al. | 210/170 |
| 5,106,233 A | 4/1992 | Breaux | 405/267 |
| 5,318,698 A | 6/1994 | Bernhardt | 210/150 |
| 5,416,257 A | 5/1995 | Peters | 588/1 |
| 5,456,550 A | 10/1995 | Devlin | 405/128 |
| 5,458,747 A | 10/1995 | Marks et al. | 204/130 |
| 5,487,622 A | 1/1996 | Cherry et al. | 405/128 |
| 5,514,279 A | 5/1996 | Blowes et al. | 210/617 |
| 5,543,317 A | 8/1996 | Shields et al. | 435/240.2 |
| 5,554,290 A | 9/1996 | Suthersan | 210/747 |
| 5,653,288 A | 8/1997 | Billings et al. | 166/305.1 |
| 5,782,583 A | 7/1998 | Vales | 405/281 |
| 5,800,096 A | 9/1998 | Barrow | 405/267 |
| 5,833,388 A | 11/1998 | Edwards et al. | 405/52 |
| 5,874,001 A | 2/1999 | Carter | 210/610 |
| 5,910,245 A | 6/1999 | Bernhardt et al. | 210/170 |
| 5,975,800 A | 11/1999 | Edwards et al. | 405/128 |
| 5,993,658 A | 11/1999 | Kato et al. | 210/611 |
| 6,020,185 A | 2/2000 | Hince et al. | 435/262 |
| 6,116,816 A * | 9/2000 | Suthersan et al. | 210/747 |
| 6,337,019 B1 * | 1/2002 | Razavi-Shirazi | 210/610 |
| 6,398,960 B1 * | 6/2002 | Borden et al. | 166/296 |

* cited by examiner

Primary Examiner—Fred Prince
(74) Attorney, Agent, or Firm—Kendal M. Sheets

(57) ABSTRACT

A method to remediate a contaminated groundwater zone by shielding electron acceptors contained in groundwater flow that interfere with beneficial anaerobic reactions in the contaminated groundwater zone. Examples of such interfering electron acceptors include dissolved oxygen, nitrate, and sulfate. The method prevents electron acceptor-rich groundwater located upgradient from a contaminated zone from flowing into the contaminated groundwater zone. By diverting acceptor-rich groundwater around a contaminated zone, beneficial anaerobic reactions are enhanced that either biodegrade the contaminants, or change the subsurface geochemical environment so that contaminants are immobilized. Methods to establish a groundwater diversion system include constructing physical barriers to block clean groundwater flowing into a contamination zone, or creating a stagnant zone hydraulically by pumping clean groundwater upgradient of the contaminated zone or injecting clean water downgradient of the contaminated zone.

24 Claims, 5 Drawing Sheets

ENHANCED ANAEROBIC TREATMENT ZONES IN GROUNDWATER

BACKGROUND OF THE INVENTION

Groundwater can be contaminated by a number of different organic and metallic compounds, causing potential threats to human health and the environment. For organic contaminants, one of the most effective methods to remediate contaminated groundwater sites is via in-situ biodegradation, where naturally occurring, or introduced, bacteria transform the contaminants to innocuous by-products. For dissolved heavy metal contaminants, chemicals are added to change the redox state of the groundwater (i.e., how aerobic or anaerobic the groundwater is) to render the contaminant immobile in groundwater.

Several beneficial biodegradation and geochemical reactions in the subsurface occur only in anaerobic or deeply anaerobic conditions, where little or no dissolved oxygen is present in the groundwater. For example, "halorespiration" is the most effective process contributing to the biodegradation of the highly chlorinated solvents such as perchloroethene, trichloroethene, trichloroethane, and carbon tetrachloride in groundwater (Wiedemeier et al., 1999). During halorespiration, the chlorinated hydrocarbon is used directly as an electron acceptor, not as a source of carbon, and a chlorine atom is removed and replaced with a hydrogen atom. The optimum range for halorespiration is under sulfate-reducing (moderately anaerobic) and methanogenic (deeply anaerobic) conditions (Wiedemeier et al., 1999).

Another biodegradation reaction of interest includes the anaerobic biodegradation of methyl-tert butyl ether (MTBE). Yeh and Novak (1994) stated that removal of MTBE was only associated with methanogenic. (deeply anaerobic) conditions. Mormile et al. (1994) found no biodegradation of MTBE under slightly or moderately anaerobic conditions (i.e., nitrate-reducing and sulfate reducing environments) but did see biodegradation under deeply anaerobic (methanogenic conditions). Wilson et al. (2000) performed column studies that demonstrated relatively high rates of MTBE biodegradation under deeply anaerobic conditions in both lab microcosm studies and at a field research site. Other beneficial anaerobic reactions involve the biodegradation of perchlorate, certain pesticides, and brominated compounds.

While metals do not biodegrade, some metals in groundwater become less mobile under anaerobic conditions. For example, under aerobic (oxidizing) conditions, hexavalent chromium Cr(VI), the most toxic form, is typically stable in groundwater. Under reducing (anaerobic) conditions, however, Cr(VI) is transformed to Cr(III), immobilizing it as the solid $Cr(OH)_3$ (Deutsch, 1997). Therefore, anaerobic reactions are beneficial as they can result in a change in geochemical conditions that can reduce the toxicity and mobility of the chromium.

Most groundwater plumes originate from long-lived stationary source zones comprised of contaminated surface soils or more commonly, subsurface accumulations of non-dissolved organics (also called non-aqueous phase liquids or NAPLs). Groundwater flows through the stationary contaminated source zones carrying unwanted dissolved oxygen, nitrate, and sulfate. If dissolved oxygen is delivered to a contaminated zone, then the efficiency of anaerobic reactions will be reduced or the anaerobic reactions will stop altogether. Similar constraints on deeply anaerobic reactions occur when nitrate and sulfate are transported to the contaminated zone as clean, upgradient groundwater flows through the contaminated zone. If a reaction only occurs under deeply anaerobic (i.e., methanogenic conditions), then the transport of nitrate and sulfate to the contaminated zone will either reduce the efficiency of the reaction, or stop the reaction altogether.

Many sites have conditions that will remove all or some of the dissolved oxygen, nitrate, and sulfate. For example, a method developed by the U.S. Air Force (Wiedemeier et al., 1996) for chlorinated solvent sites classifies a contaminated groundwater zone as a Type I, II, or III site. At Type I sites anthropogenic hydrocarbons (such as fuel contaminants) are present in source zones containing NAPL in such concentrations that some or most of the interfering electron acceptors have been removed and beneficial anaerobic biodegradation reactions are on-going. A Type II site has similar conditions, except that carbon sources are not man-made but are naturally present in the flowing groundwater. A Type III site has no hydrocarbons that can turn a site anaerobic, and therefore no beneficial anaerobic reactions can occur.

To enhance beneficial anaerobic processes for the purpose of bioremediation, numerous research groups have focused on methods to increase the supply of electron donor to the dechlorinating bacteria. Bacteria use this increased electron donor supply in two ways: 1) to react with any dissolved oxygen, nitrate, or sulfate present in the contaminated groundwater zone, making the zone more anaerobic; and 2) to react with contaminants, such as chlorinated solvents. The more dissolved oxygen, nitrate, manganese, or sulfate that is present, the more competition there is for the added electron donor.

Most researchers and technology developers have focused on adding an indirect electron donor (such as lactate, molasses, mulch, edible oil, or other carbon source) that is fermented by one type of in-situ bacteria to produce hydrogen. The hydrogen is then consumed by other types of bacteria to help induce or enhance anaerobic conditions, or used directly as a substrate in anaerobic biodegradation reactions. A second, more recent method involves the delivery of dissolved hydrogen directly to the subsurface to enhance anaerobic biodegradation of chlorinated solvents (Hughes, Newell, and Fisher, U.S. Pat. No. 5,602,296, Feb. 11, 1997).

The disadvantage to both of these methods is that 1) large quantities of electron donor can be consumed by reactions with the interfering electron acceptors; 2) addition of an electron donor is expensive due to the need for injection wells, pumps, process equipment on the surface, etc.; 3) operating the system can be risky due to the potential for moving contaminants outside the existing zone of contamination via the injection of the injection fluid; 4) operating the system can be difficult due to the potential for chemical or biological clogging of the injection wells; and 5) operating costs can be high due to the need for maintaining the process equipment and electron donor injection system.

An alternative, but still unsatisfactory, approach chemically removes electron acceptors, as opposed to adding electron acceptors. For example, Rice and Koch in U.S. Pat. No. 6,001,252, Dec. 14, 1999, teach "injecting in-situ into a groundwater-saturated matrix within or upgradient of a source of the organic compound a deoxygenated aqueous solution that comprises an electron donor to facilitate reductive dehalogenation of the organic compound." This approach chemically removes one unwanted electron acceptor, dissolved oxygen, by adding a deoxygenating agent.

Addition of a deoxygenating agent has many of the same disadvantages to adding electron donors directly to the contaminated groundwater zone: 1) large quantities of deoxygenating agent may be required; 2) addition of a deoxygenating agent is expensive due to the need for injection wells, pumps, process equipment on the surface, etc.; 3) operating the system can be risky due to potential for moving contaminants outside the existing zone of contamination if the injection fluid is injected into the contaminated groundwater zone; and 4) operating costs can be high due to the need for maintaining the process equipment and electron donor injection system.

In summary, there is a need for a method that can enhance beneficial anaerobic reactions without the need for the injection of an electron donor or deoxygenating agent.

SUMMARY OF THE INVENTION

The present invention is a method for enhancing in-situ, natural anaerobic biodegradation, also called intrinsic bioremediation or passive bioremediation, of groundwater contaminants in a saturated aquifer matrix. The type of contaminated groundwater site applicable to the present invention is identified as having the correct hydrogeological and chemical parameters for remediation via enhanced biodegradation. A shielding system is constructed at a contaminated groundwater site to physically interrupt electron acceptors in upgradient groundwater from flowing into the contaminated groundwater zone. The shield may comprise a barrier wall installed in the subsurface that diverts groundwater around the treatment zone or comprise a series of groundwater pumping wells installed to remove upgradient groundwater prior to the groundwater entering the treatment zone area.

An advantage to the shielding system is that a barrier is only constructed on the upgradient part of the contaminated groundwater treatment zone rather than completely surrounding the zone. The barrier forms a stagnant area in the contamination zone area, thereby preventing electron acceptors in clean groundwater from flowing into the stagnated zone. The barrier only needs approximately 90 percent efficiency to perform correctly, which reduces cost and expands options for material selection, alignment, and construction of the barrier. Via this approach, contaminated groundwater is not removed from the treatment zone, and all remediation is performed in-situ, which removes the environmental hazards of handling contaminated water at the surface. By constructing a barrier upgradient of a contaminated zone, beneficial anaerobic reaction rates within the zone are increased and the migration of contaminants from the zone is reduced. Additional mechanical equipment or source plume manipulation is not needed to meet remediation goals. The anaerobic microbiologic activities within the source zone are enhanced passively, thereby increasing the rate of removing contaminants within the zone while minimizing operation and maintenance activities at the site.

In the preferred embodiment, chlorinated solvents dissolved in groundwater are targeted for reductive dechlorination with enhanced anaerobic treatment. MTBE is another common contaminant that biodegrades primarily under deeply anaerobic conditions. This contaminant is a treatable chemical in an enhanced treatment system. The system may also be used to treat dissolved metals in groundwater, such as chromium. Chromium, as Cr (VI), will not biodegrade in the subsurface: however, it can be immobilized as a solid after exposure to enhanced anaerobic biodegradation reactions.

DETAILED DESCRIPTION OF PREFERRED EMBODIMENTS

Figure 1:
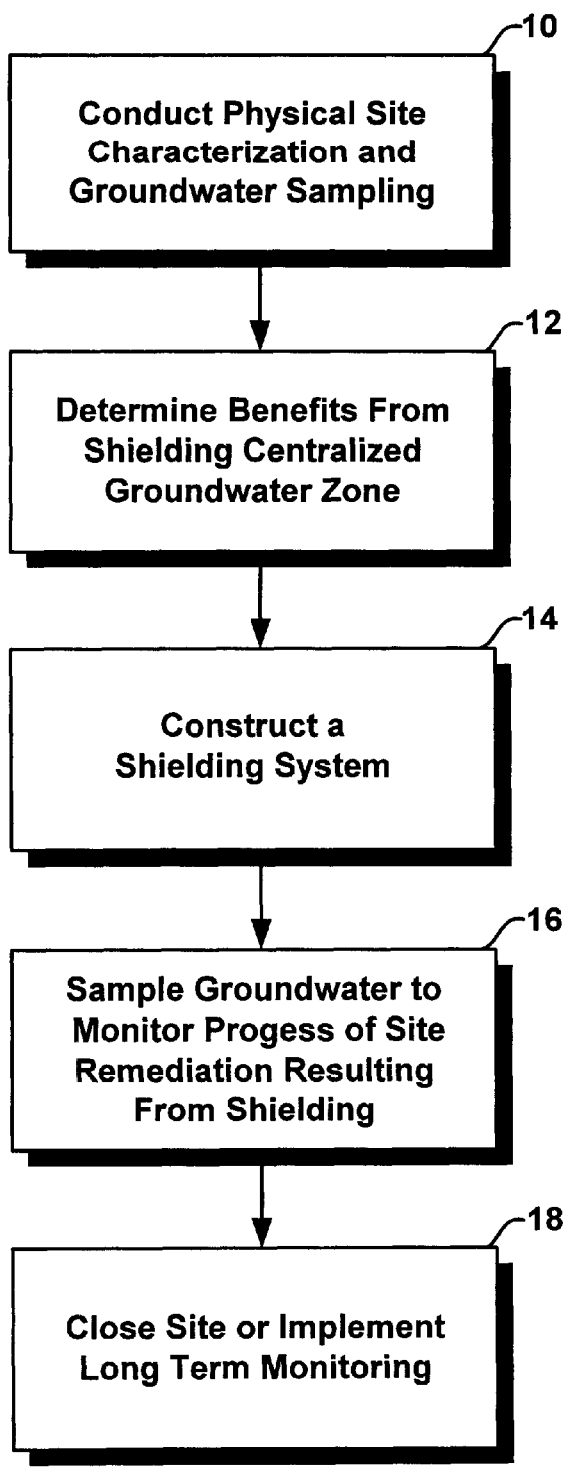
FIG. 1 is a flowchart illustrating the steps for implementation of the preferred embodiment of a novel enhanced anaerobic treatment system.

Enhancing beneficial anaerobic reactions via shielding a groundwater contamination zone from upgradient fresh groundwater flow begins with site characterization to determine a site's source, and its hydrogeologic, chemical, and biological conditions. FIG. 1 illustrates the steps for designing and implementing the preferred exemplary embodiment of a novel enhanced anaerobic treatment zone system as applied to a site having groundwater contaminated with chlorinated solvents.

First 10, the physical parameters of the treatment site are analyzed. The parameters include depth to groundwater, saturated thickness of the water-bearing unit, hydraulic conductivity, groundwater seepage velocity, and other subsurface conditions. These data are gathered through performing field investigations at the site using standard site characterization techniques such as drilling soil borings to determine stratigraphy and soil conditions, installing monitoring wells, conducting slug or pumping tests to determine hydraulic conductivity, and measuring static water levels to determine the direction of groundwater flow and the slope of the potentiometric surface of the groundwater table. In addition, soil and groundwater samples are collected to delineate the type, concentrations, and the horizontal and vertical dimensions of the contaminated groundwater zone.

Second 12, the benefits from shielding a contaminated groundwater zone from interfering electron acceptors are determined. For some contaminants, such as chlorinated solvents, the potential increase in the rate of biodegradation per year due to shielding of competing electron acceptors from the treatment zone can be calculated using accepted stoichiometry. The calculation indicating the increase in potential electron donor supply is based on groundwater velocity, plume size, and concentrations of dissolved oxygen, nitrate, and sulfate in clean, upgradient groundwater.

Dechlorination of chlorinated solvents will only occur in the appropriate geochemical environment. Conditions must be anaerobic to allow both the fermentation process and the reductive dechlorination processes to proceed. In addition, the contaminated groundwater zone must contain very low concentrations of dissolved oxygen, nitrate, and in some cases, sulfate. Dissolved oxygen concentrations should be below 1 mg/L for beneficial anaerobic reactions to proceed. Most dechlorinating bacteria will preferentially use dissolved oxygen over chlorinated solvents as electron acceptors if they are present. Therefore, competing electron acceptors must be consumed through reactions with donors in the groundwater zone, such as non-chlorinated organic substrates or hydrogen, and be kept from replenishing the contaminated groundwater zone prior to establishing an appropriate geochemical environment for an enhanced anaerobic treatment zone. The presence of dissolved oxygen in a contaminated groundwater zone harms or stops beneficial anaerobic reactions between the indigenous bacteria and the contaminant constituents that the bacteria are metabolizing. Similar problems develop with dissolved nitrate or sulfate flowing into the contaminated zone.

Preferred sites for a diversion system would be a Type I or Type III site. A diversion system would have an immediate effect at Type I sites, where anthropogenic carbon sources are present in source zones, permitting beneficial anaerobic biodegradation. Diversion of the interfering electron acceptors will result in more rapid beneficial anaerobic reactions as indigenous bacteria will no longer consume the carbon source in reactions with the electron acceptors, thereby preserving the carbon source for beneficial reactions.

At Type III sites, where no carbon sources are present and no beneficial anaerobic reactions occur, a shielding system would be useful if anaerobic biodegradation processes were going to be stimulated by the addition of electron donors such as carbon substrates or hydrogen. In this case, a shielding system would be a powerful approach for blocking the proposed reductive dechlorination zone from receiving competing electron acceptors.

At most Type II sites, where naturally-occurring carbon sources enter the contaminated groundwater zone and drive beneficial reductive dechlorination reactions, a diversion system would not likely have a beneficial effect. The "clean" groundwater from a Type II site supplies naturally-occurring electron donor and this process should not be interrupted. Compared to Type I or Type III sites, Type II sites are relatively rare in occurrence.

In an alternative embodiment, MTBE is targeted for remediation under anaerobic conditions. MTBE is a fuel additive that is widely distributed in groundwater. The E.P.A. has tentatively classified MTBE as a possible human carcinogen (U.S. E.P.A., 1996). MTBE does not volatilize or rapidly degrade under aerobic conditions as do light hydrocarbons found in gasoline. MTBE is resistant to biodegradation under slightly or moderately anaerobic conditions. Anaerobic biodegradation of MTBE and in contaminated aquifers is possible only under methanogenic, or deeply anaerobic, conditions.

In an additional embodiment, the shielding approach is applicable to sites having groundwater contaminated with dissolved metals. While metals do not biodegrade, some metals become less mobile and may precipitate out of groundwater under anaerobic conditions. Under aerobic conditions, Cr(IV), which is chromium's most toxic form, is typically stable. Under anaerobic conditions, Cr(IV) is transformed to Cr(III), a much less toxic form of chromium. The Cr(III) is then immobilized in the aquifer matrix as solid $Cr(OH)_3$. Therefore, creating a treatment zone by shielding fresh groundwater from a metals-contaminated site is beneficial to remediation of the groundwater.

If a shielding system is deemed to be beneficial at a contaminated groundwater zone, a groundwater flow model for the site may be used to determine the best location and configuration of a barrier system to divert the transport of competing electron acceptors away from the groundwater contamination zone. Using solute transport models, the rate and degree of the change in the contaminant plume due to the installation of a diversion system can be estimated.

In the third step 14 of the enhanced treatment zone system, a shielding system is constructed at the contaminated site. The system for the interruption of electron acceptors to a groundwater zone is constructed with a type of physical groundwater shield comprised of a low-permeable barrier wall is illustrated in FIGS. 2 and 3.

Figure 2A:
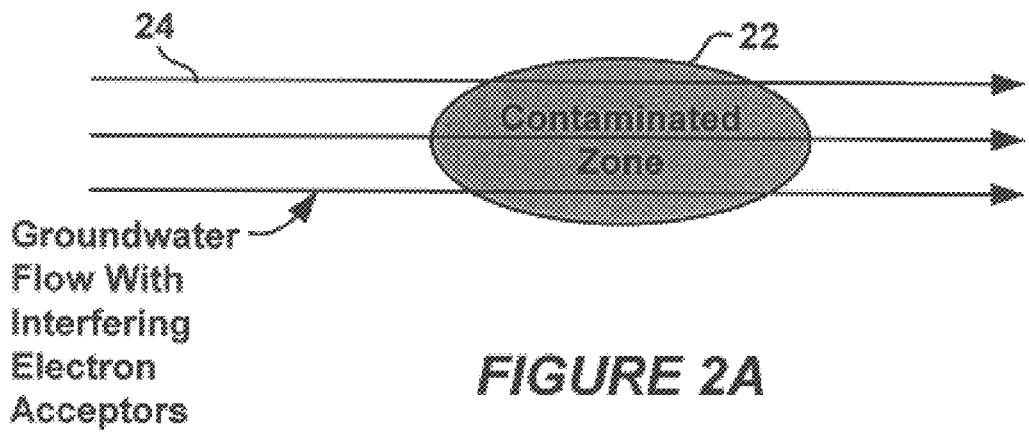
FIG. 2 is a representative illustration of the preferred embodiment in plan view.
Figure 2B:
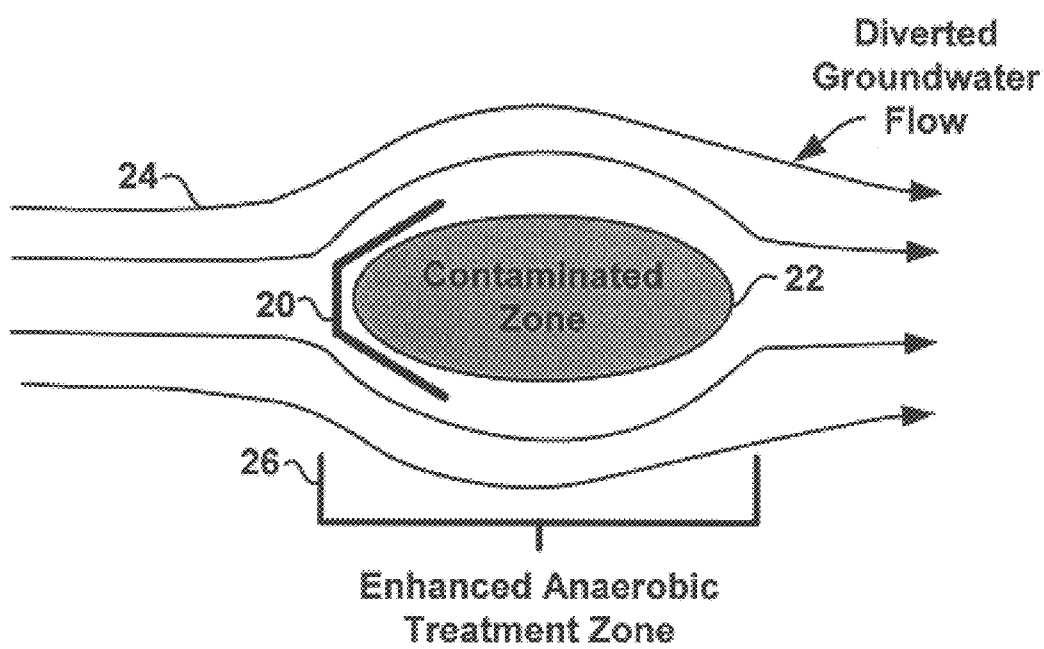

FIGS. 2A, and 2B are plan views showing a site having a contaminated zone 22 and groundwater flowpaths 24 prior to, and after, installation of a groundwater barrier. FIG. 3A illustrates groundwater flowpaths 24 traveling through a zone 22 contaminated with chlorinated solvents in the saturated aquifer matrix. The upgradient groundwater flows uninterrupted through the contaminated zone 22, mixing with contaminated groundwater, and refreshing the source zone 22 with dissolved oxygen and electron acceptors, thereby inhibiting anaerobic bioremediation.

Figure 3:
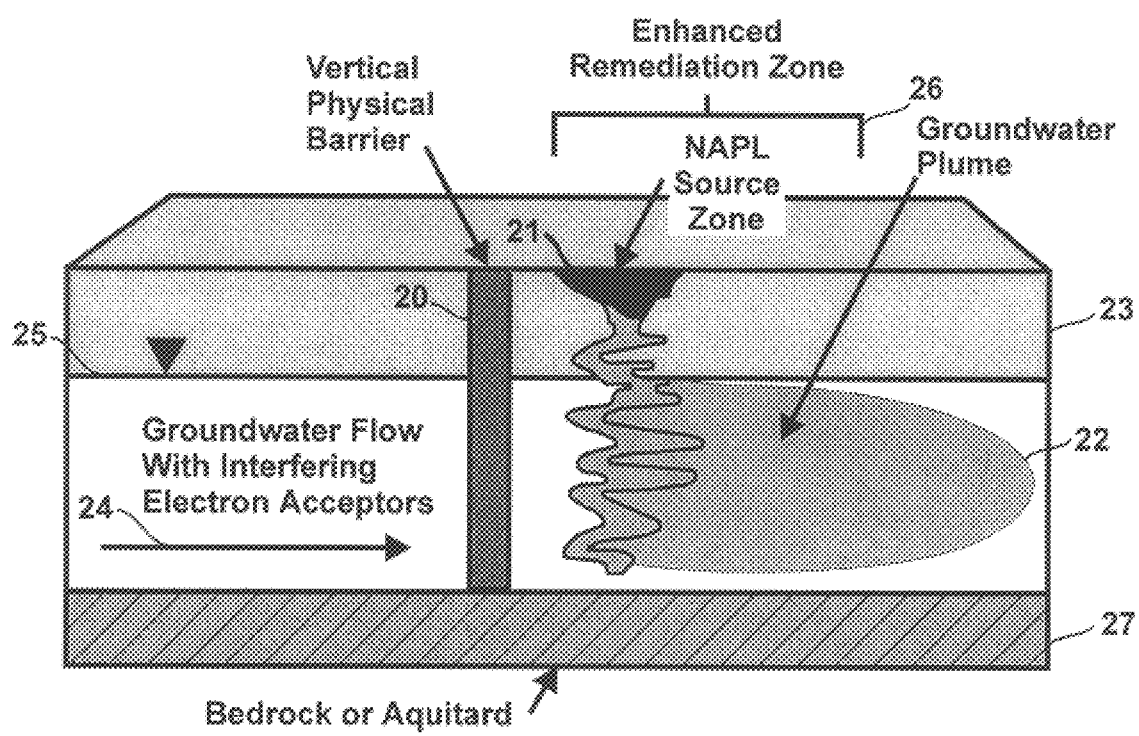
FIG. 3 is a representative illustration of the preferred embodiment in profile view.

FIG. 3 illustrates the same groundwater zone 22 contaminated with chlorinated solvents, and the groundwater flowpaths 26 subsequent to the installation of a barrier wall 20 on the upgradient side of the contaminated zone 22. The contamination zone 22 is fed by a chlorinated NAPL source zone 21. The NAPL source 21 flows downward through the vadose zone to the saturated zone 25 where it creates a dissolved contamination plume 22. The barrier wall 20 is installed upgradient of a chlorinated solvent source zone 22 through the vadose 23 and saturated 25 zones and into an aquitard created by bedrock 27, for example. The barrier 20 is placed to shield the source zone 22 from fresh groundwater flow 26 that is harmful to the creation of an enhanced anaerobic remediation zone 26. A barrier wall may also be installed to prevent cross-gradient flow from entering the enhanced anaerobic zone 26. The barrier shields the treatment zone 22 from flowing groundwater 26 that contains dissolved oxygen, nitrate, and sulfate, and diverts the groundwater 26 around the zone 22 established for beneficial anaerobic reactions. By diverting oxygen-, nitrate-, and sulfate-rich groundwater 26 around the contaminated groundwater zone 22, the competing electron acceptors will no longer "poison" the source zone 22. In the preferred embodiment, no additional chemicals, nutrients, or solutions are added to the contamination source zone 22 to deplete aerobic activity and enhance anaerobic activity. Therefore, no additional mechanical equipment is added or source plume manipulation is needed to perform the remediation activities. The anaerobic microbiologic activities within the treatment zone 26 are enhanced passively, thereby increasing the rate of contaminant removal within the zone while minimizing operation and maintenance cost at the site.

Contaminated groundwater in the enhanced anaerobic treatment zone 26 is prevented from escaping because the upgradient flow forces 24 are shielded away from the treatment area 26. Contaminants from the stagnated zone 22 could diffuse out of the treatment area 26 and into the surrounding groundwater flowpaths 24. However, the treatment zone 26 is designed so that contaminants are destroyed by the enhanced anaerobic reactions prior to escaping the zone.

In an alternative exemplary embodiment, beneficial anaerobic reactions with a contaminated treatment zone that has been shielded by a barrier can be further enhanced by the addition of electron donors to the zone. The electron donors that may be added to the treatment system include dissolved hydrogen or carbon-based fermentation substrates such as lactate, lactate polymers, vegetable oils, molasses, methanol, and benzoate. Native or foreign bacteria that have been cultured ex-situ may also be added to the treatment zone to enhance anaerobic activity.

Barrier walls can be constructed using a variety of conventional geotechnical techniques. The construction of physical barriers limits the migration of moving groundwater. The most common construction method is to excavate and then fill a trench with a low-permeability bentonite/soil slurry mix. Other technologies for constructing a barrier include permeation grouting, jet grouting, slurry walls, sheet piling, geomembrane curtain walls, soil mixing, vibrating beams, trench-and-fill methods, groundwater pumping systems, groundwater injection systems, frozen barrier systems, and injection of gases, liquids, or solids into the aquifer matrix to reduce permeability.

When physical barriers are used in some groundwater treatment systems, they are typically designed so that the barrier is a vertical barrier that completely surrounds the waste or waste site and are commonly used in conjunction with a groundwater extraction and treatment system (Rumer and Ryan, 1995). This type of design serves two purposes: 1) it contains the contaminants and 2) decreases the amount of water that must be pumped. In addition, vertical barrier walls are designed with very low permeability as described by Rumer and Ryan (1995): "A level of hydraulic conductivity equal to or less than $10^{-7}$ cm/s is normally specified for soil-bentonite slurry trench cutoff walls, one of the most common types of vertical barriers, since this is often adequate to prevent significant chemical transport by advection and is a level that can readily be achieved with careful design and construction." A vertical barrier wall with a hydraulic conductivity of $10^{-7}$ cm/sec is less permeable than a typical sandy aquifer by a factor ranging from $10^4$ to $10^6$ times.

A barrier constructed for diversion of electron acceptors would be much easier and cheaper to construct than the types of barrier systems commonly used for containment. First, a diversion barrier would be much smaller than a containment barrier because the diversion barrier would only need to be constructed on the upgradient part of the contaminated groundwater zone rather than completely surrounding the contaminated zone. The groundwater flowpaths 24, illustrated in FIG. 2, are formed around the enhanced treatment zone 26 wherein the groundwater is stagnated by the upgradient barrier 20, preventing electron acceptors in clean groundwater from flowing into the stagnant zone 22. Second, a diversion barrier 20 would be successful if only 90% of the flow is diverted around the source zone 22. This requires a barrier 20 with only an order of magnitude reduction in hydraulic conductivity (e.g., a $10^{-4}$ cm/sec barrier for a $10^{-3}$ cm/sec water-bearing unit) as opposed to barriers for waste cells that have extremely low-permeability requirements (e.g., slurry walls with $10^{-7}$ cm/sec hydraulic conductivity). Finally, a diversion barrier 20 would not need any pumping wells, unlike most containment cells that are commonly used in conjunction with a groundwater extraction and treatment system (Rumer and Ryan, 1995).

Figure 4:
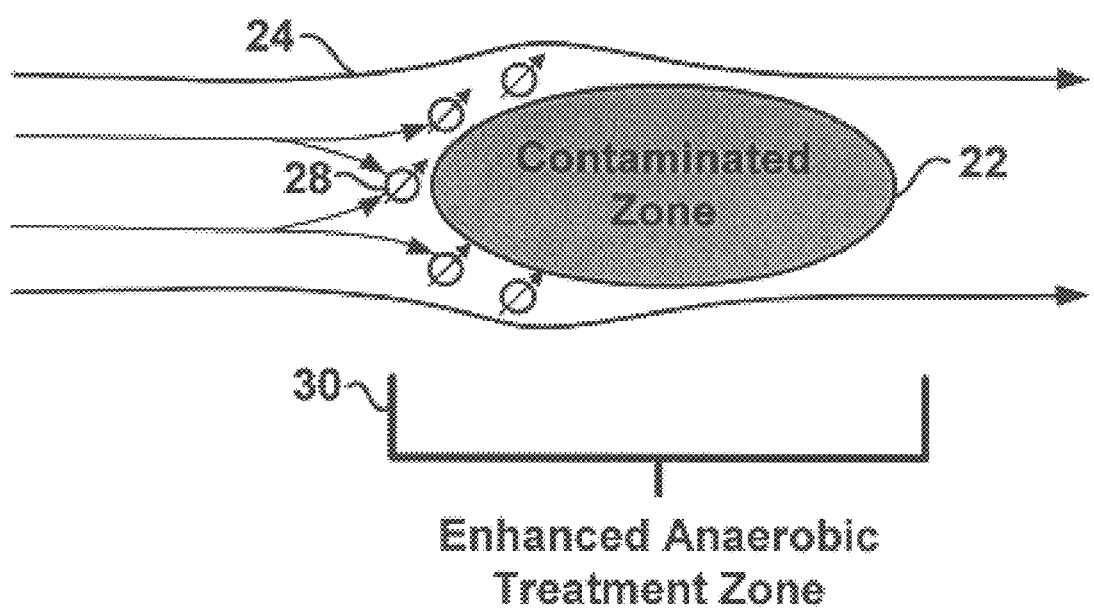
FIG. 4 is a representative illustration of an alternative embodiment.

An alternative exemplary embodiment of an enhanced anaerobic treatment zone is illustrated in FIG. 4. A shielding system is formed with groundwater pumping wells 28, positioned upgradient of the contamination source zone 22, which effectively shields the treatment zone 30 from fresh upgradient groundwater. A stagnant contaminated zone 22 is thereby created that is shielded from fresh groundwater containing abundant electron acceptors and dissolved oxygen that would inhibit enhanced anaerobic treatment of the contaminated groundwater. The pumping wells 28 are placed adjacent to the upgradient perimeter of the contaminated zone 22 to shield the zone from groundwater flowing downgradient and cross-gradient then treatment zone 30.

In an alternative embodiment, groundwater injection wells are installed downgradient of a contaminated groundwater zone. Injection of clean groundwater into downgradient wells stops groundwater flow upgradient of the wells, which includes the area of a contamination zone. This method creates an effective barrier upgradient to a contaminated zone, depending upon the injection rate, and the number and distribution of the injection wells.

Figure 5:
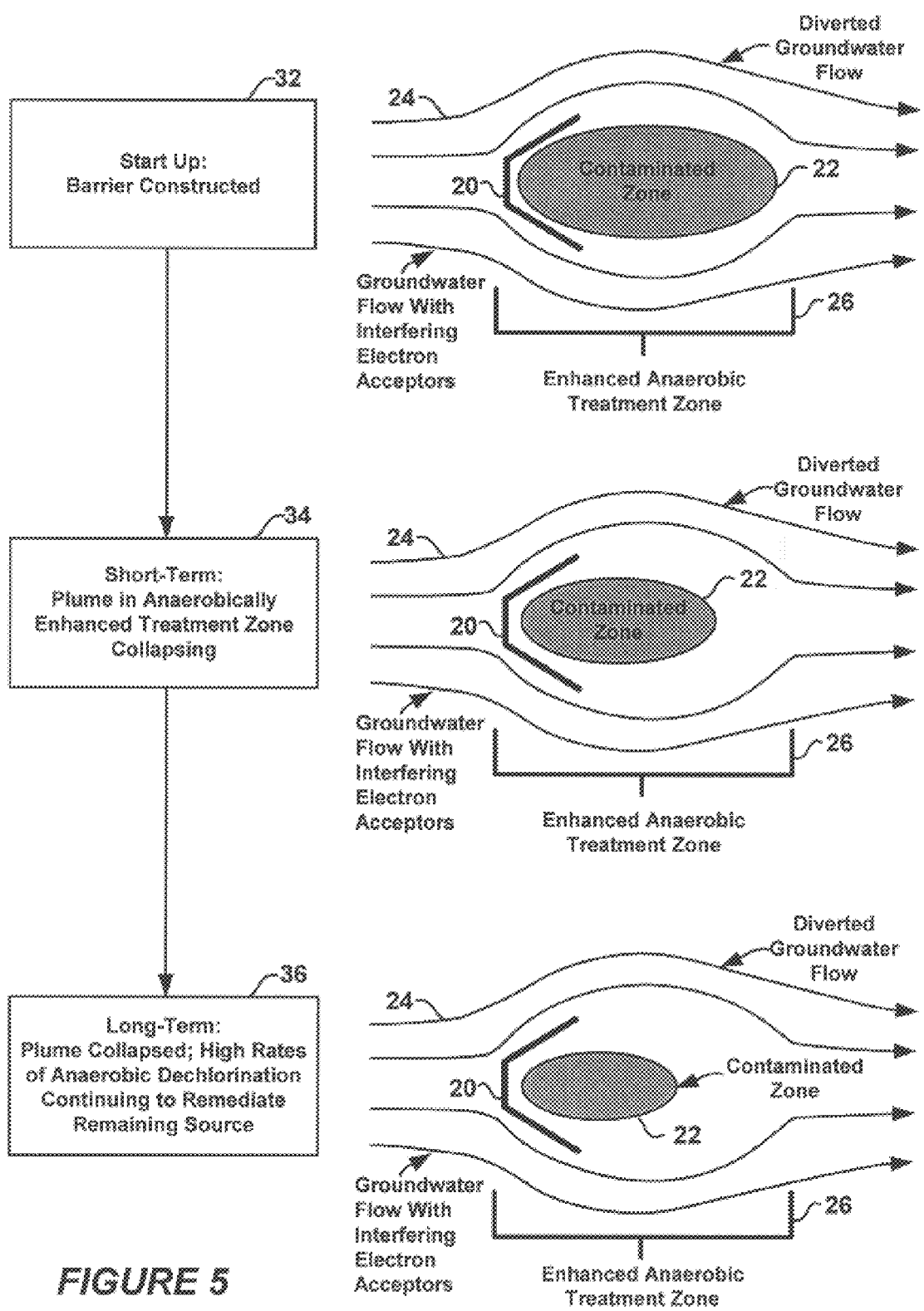
FIG. 5 is an illustration of the preferred embodiment collapsing a contaminant plume.

By constructing a shielding system upgradient of a contaminated zone, anaerobic biodegradation rates within a treatment zone increase and the migration of contaminants from the source zone is reduced. The increase in anaerobic biodegradation rates collapses the contaminated groundwater zone, thereby eliminating the need for groundwater pump-and-treat systems. FIG. 5 illustrates the performance of a shielding system that enhances biodegradation. In the initial phase 32, a barrier wall 20 is installed on the upgradient side of the zone 22. In the short-term phase 34, reductive dechlorination through enhanced anaerobic reactions begins to shrink the contamination plume 22 size. Over time, the contaminated groundwater zone finally collapses 36 and is destroyed by anaerobic biodegradation. The time period required for destruction of contaminants anaerobically is related to groundwater seepage velocity, attenuation processes, and the size of the contaminated groundwater zone 22.

The fourth step 16 in the preferred embodiment is monitoring and sampling existing or newly installed groundwater monitoring wells in the contaminated groundwater zone to monitor site remediation progress resulting from shielding. Typical parameters in the groundwater monitoring program include: chlorinated solvent concentrations; parent to daughter ratios of solvent degradations; ethene-ethane-methane ratios; water quality parameters such as chloride concentration; and concentrations of competing electron acceptors. In addition, the vapor in the unsaturated soils above the contaminated groundwater zone can be sampled to detect changes in key constituents (ethane-ethane-methane) that may be off-gassed from the groundwater after the diversion system is installed.

In the fifth step 18 of groundwater remediation with an enhanced anaerobic treatment zone, after the contaminated groundwater zone is demonstrated to be stable or shrinking and regulatory approval is obtained and the site either is closed or enters into a limited long-term monitoring program until contaminant concentrations fall below regulatory thresholds.

EXAMPLE

The ability of the preferred embodiment to remediate a site contaminated with chlorinated solvents can be estimated based on representative hydrogeologic and constituent concentration data.

Table 1 lists typical data for a site contaminated with chlorinated solvents derived from a 14-site Air Force chlorinated site databases listed in Appendix A in Wiedemeier et al. (1999):

TABLE 1

| | |
|---|---|
| Median plume/source width: 400 ft | Median Background Dissolved Oxygen: 8.0 mg/L |
| Median saturated thickness: 40 ft | Median Background Nitrate: 5.8 mg/L |
| Median seepage velocity: 110 ft/yr. | Median Total Chlorinated Solvents in Source: 1.5 mg/L |

Assuming that a site has the characteristics in Table 1 and a porosity of 0.3, a representative specific discharge through a chlorinated solvent source zone is equivalent to $15 \times 10^6$ L/yr. of flow. Approximately 120 kg of dissolved oxygen and 87 kg of nitrate flow into a representative source zone per year, where they "steal" crucial electron donors. A useful method to account for the potential amount of lost reductive dechlorination to competing electron acceptors is to assume that every 16 kilograms of dissolved oxygen can consume the equivalent of 2 kilograms of dissolved hydrogen (based on the stoichiometry of water formation), and that every 50 kilograms of nitrate can consume the equivalent of 4 kilograms of dissolved hydrogen (based on the stoichiometry of the nitrate reaction). Therefore, the introduction of the 120 kilograms of dissolved oxygen and 87 kilograms of nitrate into the source zone per year is equivalent to the consumption of 22 kilograms of dissolved hydrogen per year (i.e., 120*2/16+87*4/50). Finally, if one uses the accepted stoichiometry where 1 kg of hydrogen has the potential to completely dechlorinate 21 kilograms of chlorinated solvents, then an additional 462 kilograms of chlorinated solvents (e.g., PCE) could be completely dechlorinated (e.g. transformed to ethene) per year (assuming no loss to other mechanisms). By comparison, naturally-occurring reductive dechlorination processes in a source zone at a typical chlorinated solvent site are probably on the order of tens of kilograms per year. Using a typical biodegradation rate coefficient for chlorinated solvents and the representative data listed above, it is estimated that only 20 kilograms of solvents are biodegraded naturally per year in a 400 ft by 400 ft source zone.

Therefore, merely diverting the competing electron acceptors away from the source zone has the potential to increase the biodegradation of chlorinated solvents in the source zone of a representative site from about 20 to 462 kilograms per year, which is more than a 20-fold increase in the naturally-occurring biodegradation rate. Note this calculation did not include the effects for diverting sulfate, which could further increase the effectiveness of a diversion system.

Construction of a diversion barrier at this site greatly accelerates the natural rate of chlorinated solvent attenuation from the source zone with a single, inexpensive construction effort that has no permitting challenges and no on-going operation and maintenance requirements except for periodic monitoring.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

We claim:

1. A method to enhance the remediation of a contaminated groundwater zone, comprising:
   shielding a contaminated groundwater zone from electron acceptors contained in a groundwater source that interfere with beneficial anaerobic reactions with groundwater contaminants in said contaminated groundwater zone.

2. A method according to claim 1, wherein:
   said beneficial anaerobic reactions include reactions that biodegrade said groundwater contaminants in said groundwater contaminated zone.

3. A method according to claim 1, wherein:
   said interfering electron acceptors are selected from the group consisting of natural or anthropogenic dissolved oxygen, nitrate, and sulfate.

4. A method according to claim 1, wherein:
   said groundwater contaminants include chlorinated hydrocarbons.

5. A method according to claim 1, wherein:
   said groundwater contaminants include organic pesticide compounds.

6. A method according to claim 1, wherein:
   said groundwater contaminants include brominated compounds.

7. A method according to claim 1, wherein:
   said groundwater contaminants include methyl-tert-butyl-ether.

8. A method according to claim 1, wherein:
   said groundwater contaminants include perchlorate.

9. A method according to claim 1, further including:
   said beneficial anaerobic reactions include reactions that change geochemical conditions so that said changed geochemical conditions reduce the mobility of dissolved heavy metals in said contaminated groundwater.

10. A method according to claim 9, wherein:
    said dissolved heavy metals include chromium.

11. A method according to claim 1, wherein:
    said shielding of a contaminated groundwater zone is performed using a physical barrier.

12. A method according to claim 11 wherein:
    said shielding using said physical barrier is performed using a subsurface horizontal physical barrier to prevent downward migration of said groundwater containing said competing electron acceptors.

13. A method according to claim 12, further including:
    said method of using said subsurface horizontal physical barrier includes using a ground surface horizontal physical barrier to reduce infiltration of rainwater into the contaminated groundwater zone.

14. A method according to claim 11, wherein:
    said physical barrier partially surrounds said contaminated groundwater zone to divert said groundwater flow that contains said interfering electron acceptors.

15. A method according to claim 1, further including:
    said shielding a contaminated groundwater zone is performed using a hydraulic barrier, said hydraulic barrier includes pumping said groundwater upgradient of said contaminated groundwater zone to create a stagnant zone encompassing said contaminated groundwater zone; and
    injecting said groundwater downgradient of said contaminated groundwater zone to create said stagnant zone encompassing said contaminated groundwater zone.

16. A method according to claim 1, wherein:
    said beneficial anaerobic reactions in said contaminated groundwater zone are further enhanced by the addition of electron donors to said contaminated groundwater zone.

17. A method according to claim 16, wherein:
    said electron donors include dissolved hydrogen and carbon-based fermentation substrates.

18. A method according to claim 17, wherein:
    said carbon-based fermentation substrates are selected from the group consisting of lactate, lactate polymers, vegetable oils, molasses, methanol, and benzoate.

19. A method according to claim 1, wherein:
    said beneficial anaerobic reactions in said contaminated groundwater zone are further enhanced by the addition of bacteria cultured ex-situ.

20. A method to enhance the remediation of a contaminated groundwater zone, comprising the steps of:
    shielding a contaminated groundwater zone from a groundwater source;
    interrupting transportation of the electron acceptors contained in said groundwater source that interfere with beneficial anaerobic reactions in said contaminated groundwater zone; and
    enhancing said beneficial anaerobic reactions to remediate said contaminated groundwater zone.

21. A method to enhance beneficial anaerobic reactions in a contaminated groundwater zone, comprising the steps of:
    determining if naturally-occurring or anthropogenic electron acceptors in groundwater interfere with beneficial anaerobic reactions in a contaminated groundwater zone; and
    constructing a groundwater diversion system to prevent interfering electron acceptors from transporting into all or part of said contamination source zone.

22. A method according to claim 21, further including:
    performing calculations that determine if shielding said contaminated groundwater zone from said interfering electron acceptors will enhance said beneficial anaerobic reactions.

23. A method according to claim 21, further including:
    calculating the amount of dissolved hydrogen that is preserved by shielding said contaminated groundwater zone.

24. A method according to claim 23, further including:
    calculating increasing biodegradation rates of chlorinated solvents due to the preservation of dissolved hydrogen.

* * * * *